Aug. 4, 1953     J. A. HOPWOOD     2,647,302
METHOD OF REMODELING MILK CANS
Filed Jan. 4, 1949     2 Sheets-Sheet 2
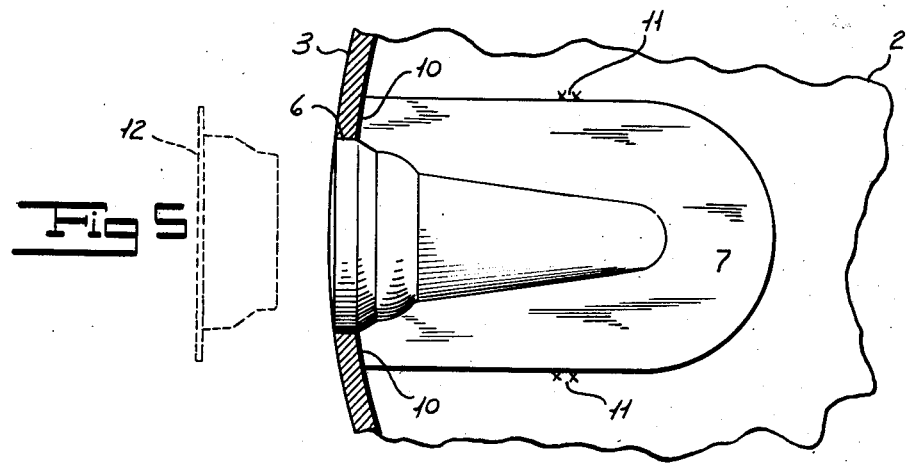
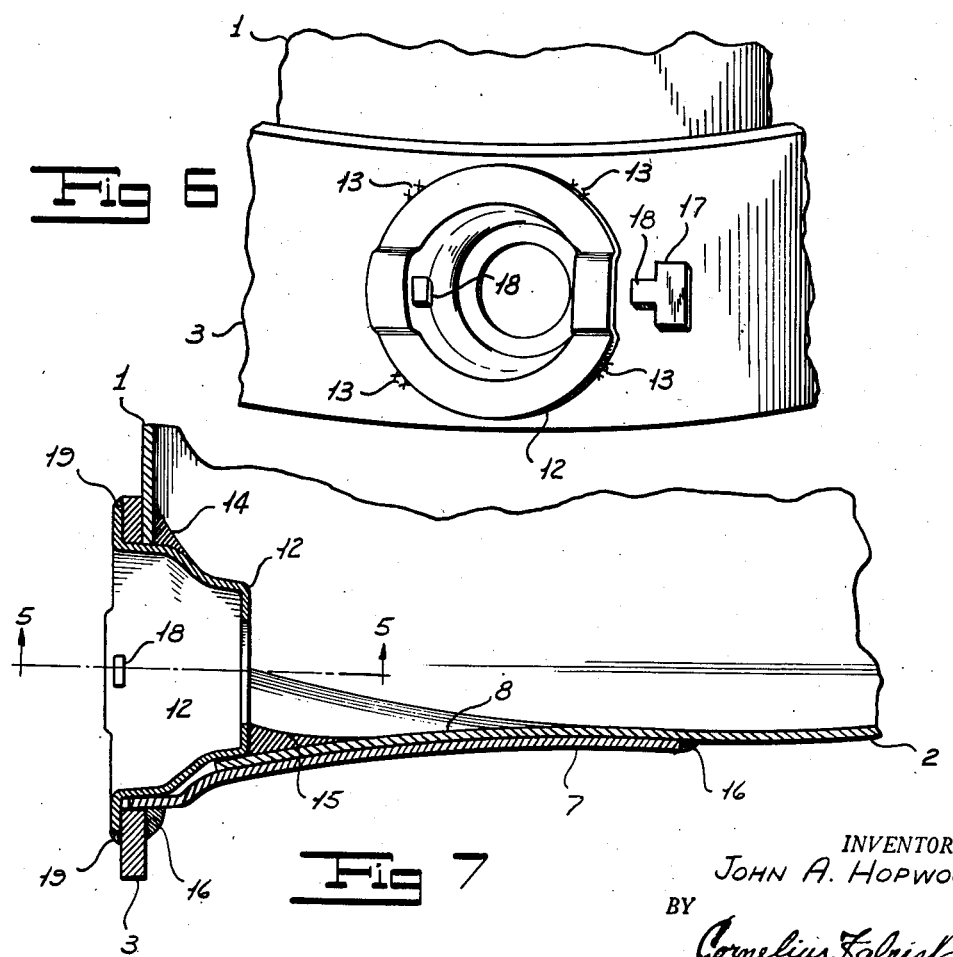
INVENTOR.
JOHN A. HOPWOOD
BY
*Cornelius Zabriskie*
ATTORNEY Patented Aug. 4, 1953

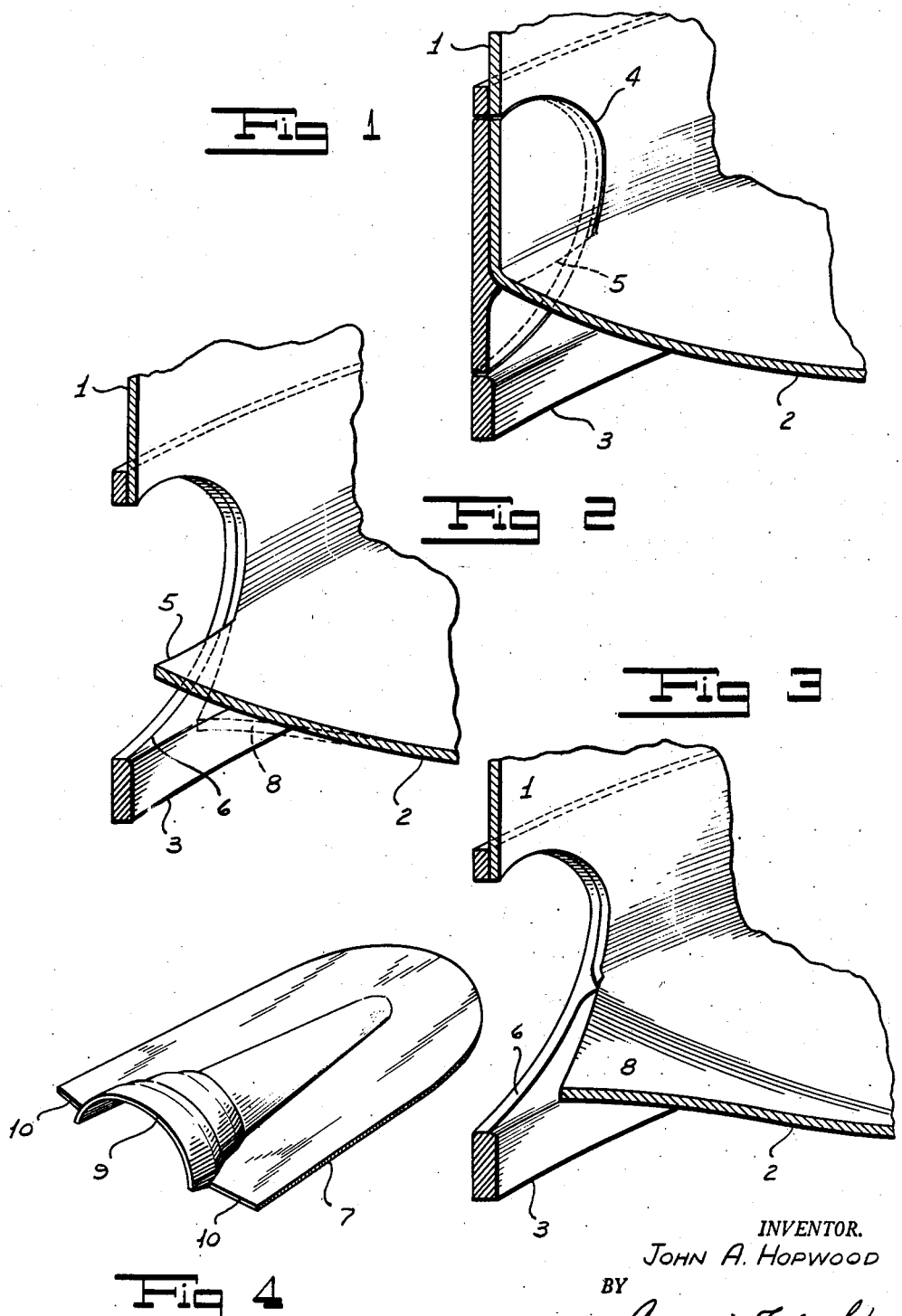

2,647,302

UNITED STATES PATENT OFFICE 2,647,302

METHOD OF REMODELING MILK CANS

John A. Hopwood, Westfield, N. J., assignor to Monitor Process Corporation, Jersey City, N. J., a corporation of New Jersey Application January 4, 1949, Serial No. 69,083

3 Claims. (Cl. 29—148.2)

This invention is an improvement upon my prior United States Letters Patent No. 2,292,836 and No. 2,354,995. These prior patents, as well as the present invention, relate to milk delivery cans, wherein milk is delivered through a milk delivery tube adapted to cooperate with an opening in the side wall of the can and near the base of the latter. Side delivery cans may be initially manufactured as such, but there are large quantities of conventional milk delivery cans already in use which it is desired to convert to permit of side delivery of the character referred to. The present invention provides a method whereby this may be accomplished, as well as a can modified according to such method.

As cans are generally made, they comprise a can body having a concave bottom which may or may not be integral with the side wall of the can, but, in any event, such cans are provided around their lower margin with a reinforcing ring of relatively heavy metal, soldered, welded or otherwise secured to the side wall of the can and projecting below the bottom to take the wear incident to the use of the can. As the cans are generally manufactured, they have an open top but are otherwise imperforate. To adapt such a can for side delivery, it is necessary to provide an opening in the side wall of the can, sufficiently close to the bottom, so that all of the milk may be drawn from the can through dispensing means associated with such opening, when the can is standing in upright position.

My said prior patents provide a method of accomplishing this result and a can capable of such use, but the inventions of said patents necessitated the slitting of the bottom of the can adjacent the discharge opening, the resulting slit being covered at the under side of the bottom by a plate affixed to the bottom of the can through the use of conventional soft solder, i. e., solder embodying substantially equal parts of lead and tin. At the present time there appears to be a feeling on the part of some health authorities that contact between fluid milk and the lead component of the conventional soft solder may possibly have some deleterious effect upon the milk. In my prior patents where the bottom of the can was slit to form the channel and the reinforcing plate was secured in place by soft solder, a considerable amount of such solder was exposed to contact with the milk. The present invention makes it possible to overcome the objection to slitting the bottom of the can and also makes it possible to soft solder all exterior portions of the can without such soft solder coming into contact with the milk in the can.

In carrying out this invention, the bottom of the can is depressed to form a channel leading to the side opening of the can so that all of the milk can be drained from the can. The formation of this channel, however, is accomplished without slitting the bottom of the can and the packing cup through which the milk delivery tube is adapted to extend into the can is so positioned with respect to the channel as to deliver all of the milk from the can. In the preferred form of the invention all parts interior of the can and comprised in the present invention are secured in place by a tinning or brazing operation, while the exterior parts of the can may be soft soldered as before without the lead of such soft solder coming into contact with the contents of the can.

A plate is used on the under side of the bottom to reinforce the channel and this plate may be conveniently secured in place by soft solder and soft solder may be also employed to secure the cup to the exterior of the side wall of the can or to the reinforcing ring through which it generally passes. By this means the milk is safeguarded against lead contamination, yet the parts which enter into the structure are firmly united to one another without cracks or crevices for the lodgement of bacteria or other foreign matter.

Features of the invention, other than those adverted to, will be apparent from the hereinafter detailed description and appended claims, when read in conjunction with the accompanying drawings.

The accompanying drawings illustrate one practical form of the invention and one exemplary method of producing the same, but the disclosure therein made is to be understood as illustrative, only, and not as defining the limits of the invention.

Figures 1, 2 and 3 inclusive are fragmental perspective sections showing the lower portion of one side of a can in section and illustrating the consecutive steps of the method of remodeling these parts to permit the installation of the cup which will serve as a mounting for a draw-off or delivery tube.

Figure 4 is a perspective view of a reinforcing plate adapted to underlie the bottom of the can adjacent the discharge opening.

Figure 5 is a fragmental underneath view of a portion of the bottom of the can with the reinforcing ring of the can shown in horizontal section, this section being taken substantially in the plane of the line 5—5 of Figure 7.

Figure 6 is a fragmental elevation looking from the outside of the can with the parts at one stage of the method.

Figure 7 is a vertical fragmental section through one lateral half of the can at the discharge opening showing the can completely remodeled according to the present invention.

For the purpose of illustrating the invention, the drawings show a can wherein the side wall 1 of the body of the can and the dished bottom 2 thereof are made integral or welded to one another, so that these two parts are, in effect, integral. The reinforcing ring is shown at 3 and it is generally welded about the lower portion of the side wall 1 to extend sufficiently below the bottom 2 to preclude contact between the bottom and any flat surface on which the can may rest.

In carrying out the invention in its preferred form, a portion of the side wall of the can and the juxtaposed portion of the ring 3 are operated upon by a barrel saw, to produce a circular cut 4, the lowermost portion of which is substantially tangent to the horizontal plane of the lowermost portion of the bottom 2. This cut is made so as to extend entirely through the ring 3 and through the side wall 1 of the can, as shown in Figure 1, but not to extend appreciably into the bottom 2 of the can.

After this circular cut is made, the cut-out portion of the side wall and ring are still held in place, as shown in Figure 1, by the attachment of the severed portion of the side wall to the bottom 2 of the can. This connection is next severed by means of a cut 5 indicated in dotted lines in Figure 1 and when this cut is accomplished, it serves to shear the bottom of the can adjacent the side wall, so that the portions of these parts which have been circumscribed by the barrel saw, will fall away leaving the parts in condition shown in full lines in Figure 2. This operation leaves a portion of the bottom of the can extending chordally across the opening 6 through the ring and side wall, as clearly appears in Figure 2.

The next step in the method consists in depressing that chordal extending portion of the bottom, by means of suitable dies, as indicated in dotted lines in Figure 2, so as to form a channel 8 extending from substantially the center of the can to a point adjacent the inner surface of the ring 3, the curvature of the channel being such as to substantially correspond to the arcuate shape of the lower portion of the opening 6 as illustrated in Figure 3.

The can is then inverted and there is placed against the under surface of the bottom a reinforcing plate 7 which is so shaped as to substantially conform to the under surface of the bottom and the channel 8 which has been formed therein as stated. This plate has an extension 9 adapted to project into the opening 6 and at the base of this extension are shoulders 10 to engage with the inner surface of the ring 3 and thus facilitate accurate positioning of the plate. After the plate has been placed in position, both the plate and the bottom of the can are acted upon between conforming dies so as to conform the plate and the overlying portion of the bottom into exact conformity. This having been accomplished, the plate may be "tacked" to the bottom, as indicated at 11, by soft solder to hold it in position during steps presently described.

The cup 12, which is generally in the form of a sheet metal stamping, is next passed through the opening 6 into the position shown in Figures 6 and 7 and is tacked in place, e. g., by soft solder, as indicated at 13, to temporarily hold it in position.

The can is next returned to upright position and there is applied to the interior of the can fillets 14 and 15 which serve to secure the cup 12 firmly in place and produce leak tight joints. At the same time the fillets eliminate all cracks, crevices or sharp corners and produce a perfectly smooth interior of the can at the discharge opening. These fillets may in practice be formed from conventional soft solder without departing from this invention, but in order to protect the contents of the can from lead contamination, it is preferred to use tin, a brazing compound or welding metal for this purpose. In practice I employ substantially pure tin, as I find that it is most acceptable to health authorities generally. When using tin, a brazing compound or welding metal, considerable heat is required to form the necessary bond and a torch is generally used for this purpose, but inasmuch as the ring 3 is quite heavy and the heat is localized I have found that adequate heat may be applied in a localized manner as not to release the tacking 11 or 13.

The can is then again inverted and the plate 7 is thereupon permanently secured in place. Brazing, welding, tinning or soft solder may be employed in this connection, but it is convenient and thoroughly practical to use soft solder. Fillets 16 of such material, shown in Figure 7, are formed during this operation so as to impart to the structure a smooth exterior without sharp corners or crevices in which foreign matter may lodge. Next lug blanks 17 are associated with the cup, as indicated in Figures 6 and 7, to produce attaching lugs 18 for the delivery tube and after these lugs have been brought into position, the cup and lugs are permanently secured in place by brazing, tinning, welding or soft soldering. Inasmuch as these materials are isolated from contact with the contents of the can, I find it convenient and economical to employ soft solder for this purpose. Fillets 19, shown in Figure 7, may be formed during attachment of the cup to give a smooth exterior.

It will further be noted that while soft solder may be used on the exterior parts of the can, the use of soft solder is preferably eliminated in the interior of the can. Brazing compounds, welding or tinning have been referred to as examples of lead-free materials used. I consider these materials, for the purpose of the present invention, as equivalents to tin as used in this connection and in the claims reference to tin or tinning is to be so construed.

By practicing the method which I have described, the side delivery of milk from the can is provided for in the preferred form of the invention without exposing the milk interior of the can to any real or supposed deteriorating effects of soft solder or the lead thereof. A stronger construction is provided than results from the methods or constructions of my prior patents and the slitting of the bottom is entirely avoided.

In the method as hereinbefore described I have set forth the preferred sequence of steps in carrying out the method of this invention, but I wish it understood that this particular sequence of the method steps may be varied without departing from the invention.

The foregoing detailed description sets forth the invention in its preferred practical form, but the invention is to be understood as fully commensurate with the appended claims.

Having thus fully described the invention, what

I claim as new and desire to secure by Letters Patent is:

1. Method of remodeling a milk can having a side wall, a dished bottom and a reinforcing ring, for the delivery of milk through said side wall adjacent said bottom, which comprises the following steps: cutting through the reinforcing ring a circular opening the lowermost portion of which is substantially tangent to the horizontal plane of the lowermost portion of the bottom of the can, making in the side wall of the can an arcuate cut registering with the juxtaposed portion of said circular opening in the reinforcing ring, making a chordal cut along the juncture of the side wall and bottom to connect the opposite ends of said arcuate cut to cut away that portion of the side wall which registers with the opening in the ring, depressing that portion of the bottom which is juxtaposed with the ring opening without radially slitting said bottom to form a channel from substantially the center of the can to and conforming with the lower portion of the ring opening, inserting into said opening from the exterior of the can a discharge tube mounting cup, securing the cup in place interiorly of the can to the side wall and bottom of the can to produce an impervious joint between the cup and the opening, applying a reinforcing plate beneath the channel in the bottom of the can, and securing said plate and cup to the can exteriorly of the latter.

2. Method as claimed in claim 1, wherein the cup is secured interiorly of the can by applying fillets of tinning material to the cup and to the side wall and bottom of the can.

3. Method as claimed in claim 1, wherein the cup is secured interiorly of the can by applying fillets of tinning material to the cup and to the side wall and bottom of the can, and securing the cup and reinforcing plate exteriorly of the can by soldering them in place externally of the can.

JOHN A. HOPWOOD.

References Cited in the file of this patent

UNITED STATES PATENTS

| Number | Name | Date |
|---|---|---|
| 984,921 | Donnell | Feb. 21, 1911 |
| 1,013,810 | Peacock | Jan. 2, 1912 |
| 2,292,836 | Hopwood | Aug. 11, 1942 |
| 2,354,995 | Hopwood | Aug. 1, 1944 |